United States Patent
Roach

(10) Patent No.: US 8,504,221 B2
(45) Date of Patent: Aug. 6, 2013

(54) APPARATUS AND METHOD FOR CONTROLLING A CONTROL SURFACE OF A VEHICLE BASED ON A LOAD IDENTIFIED ON THE CONTROL SURFACE

(75) Inventor: Jeffrey M. Roach, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 1007 days.

(21) Appl. No.: 12/355,225

(22) Filed: Jan. 16, 2009

(65) Prior Publication Data
US 2010/0185344 A1 Jul. 22, 2010

(51) Int. Cl.
*B64C 13/16* (2006.01)

(52) U.S. Cl.
USPC .................................. 701/4; 244/76 R; 475/5

(58) Field of Classification Search
USPC .............. 701/3, 4, 48; 244/99.4, 99.9, 99.13, 244/174, 194, 195, 76 A, 76 C, 110 D, 90 B, 244/192, 224, 76 R, 90 A; 416/37; 60/406; 192/223, 223.2–223.4; 73/170.14, 170.15, 73/702, 147; 704/4; 475/5, 254, 263, 6, 475/900
See application file for complete search history.

(56) References Cited

U.S. PATENT DOCUMENTS

| | | | | | |
|---|---|---|---|---|---|
| 4,173,322 | A | * | 11/1979 | Macdonald | 244/78.1 |
| 4,188,823 | A | * | 2/1980 | Hood | 73/147 |
| 4,260,121 | A | * | 4/1981 | Baston et al. | 244/213 |
| 4,394,999 | A | * | 7/1983 | Botzler | 244/99.4 |
| 4,496,121 | A | * | 1/1985 | Berlin | 244/99.13 |
| 4,498,647 | A | * | 2/1985 | Boehringer et al. | 244/99.3 |
| 4,762,205 | A | * | 8/1988 | Ortman | 188/71.2 |
| 4,800,798 | A | * | 1/1989 | Boldrin et al. | 91/361 |
| 4,904,999 | A | * | 2/1990 | Klansnic et al. | 340/945 |
| 4,905,933 | A | * | 3/1990 | Ako | 244/99.4 |
| 4,930,730 | A | * | 6/1990 | Quick | 244/224 |
| 5,806,806 | A | * | 9/1998 | Boehringer et al. | 244/196 |
| 6,241,182 | B1 | * | 6/2001 | Durandeau et al. | 244/99.4 |
| 6,588,704 | B2 | * | 7/2003 | Rodrigues | 244/76 R |
| 6,672,540 | B1 | * | 1/2004 | Shaheen et al. | 244/99.3 |
| 6,704,624 | B2 | * | 3/2004 | Ortega et al. | 701/3 |
| 6,752,020 | B1 | * | 6/2004 | Sobotta et al. | 73/702 |
| 6,766,981 | B2 | * | 7/2004 | Volk | 244/76 C |
| 6,776,376 | B2 | * | 8/2004 | Collins | 244/213 |
| 6,824,099 | B1 | * | 11/2004 | Jones | 244/99.12 |
| 7,283,933 | B2 | | 10/2007 | Roach et al. | |
| 7,506,842 | B2 | * | 3/2009 | Jones | 244/226 |
| 7,600,715 | B2 | * | 10/2009 | Matsui | 244/99.6 |
| 2004/0111190 | A1 | * | 6/2004 | Van De Kreeke et al. | 701/3 |
| 2005/0103932 | A1 | * | 5/2005 | Huynh | 244/75 R |
| 2005/0234606 | A1 | * | 10/2005 | Giazotto | 701/3 |
| 2011/0004361 | A1 | * | 1/2011 | Goupil et al. | 701/3 |

OTHER PUBLICATIONS

U.S. Appl. No. 11/953,567, filed Dec. 10, 2007, Sheahan Jr.

* cited by examiner

*Primary Examiner* — Marthe Marc-Coleman
(74) *Attorney, Agent, or Firm* — Yee & Associates, P.C.

(57) ABSTRACT

A method, apparatus, and computer program product are present for controlling a control surface. A load is identified on the control surface to form an identified load. A direction of movement of the control surface is identified from the identified load to form an identified movement. A brake associated with the control surface is engaged if the identified movement is away from a desired position for the control surface.

21 Claims, 5 Drawing Sheets

APPARATUS AND METHOD FOR CONTROLLING A CONTROL SURFACE OF A VEHICLE BASED ON A LOAD IDENTIFIED ON THE CONTROL SURFACE

BACKGROUND INFORMATION

1. Field

The present disclosure relates generally to aircraft and, in particular, to control systems for aircraft. Still more particularly, the present disclosure relates to a method and apparatus for controlling a control surface of an aircraft.

2. Background

Flight control surfaces on an aircraft may be used to control the flight of an aircraft. Flight control surfaces may be used to adjust and control movement of an aircraft, such as flight attitude. With fixed-wing aircraft, control surfaces may be attached to an airframe on hinges and/or tracks. These control surfaces may move in a manner that deflects an airstream passing over the control surfaces. This redirection of the airstream may generate an unbalanced force to rotate the aircraft about an axis. This axis may be a vertical axis, a longitudinal axis, or a lateral axis. Movement around the vertical axis is referred to as yaw, movement around the longitudinal axis is referred to as bank or roll, and movement about the lateral axis is referred to as pitch.

In some situations, an actuator may not perform correctly to provide the desired movement. With this type of situation, redundant actuators may be present to provide movement of the control surface when the original actuator is unable to provide the desired movement.

This type of redundancy, however, may add to the weight of an aircraft. Further, by having additional redundant actuators for control surfaces, the expense to manufacture an aircraft also increases.

In these situations, the control surface may be moved to a predefined position. This operation is commonly implemented in hydraulic control actuators by means of a hydromechanical design commonly referred to as neutral lock or hole in the wall reversion mode.

Therefore, it would be desirable to have a system that possibly takes into account one or more of these issues as well as possibly other issues.

SUMMARY

In one advantageous embodiment, a method is present for controlling a control surface. A load is identified on the control surface to form an identified load. A direction of movement of the control surface is identified from the identified load to form an identified movement. A brake associated with the control surface is engaged if the identified movement is away from a desired position for the control surface.

In another advantageous embodiment, an apparatus comprises a control process and a data processing system capable of executing the control process. The control process is capable of identifying a load on the control surface to form an identified load. The control process is also capable of identifying a direction of movement of the control surface from the identified load to form an identified movement. Further, the control process is capable of engaging a brake associated with the control surface if the identified movement is away from a desired position for the control surface.

In yet another advantageous embodiment, a computer program product is present for controlling a control surface. The computer program product comprises a computer recordable storage medium and program code stored on the computer recordable storage medium. Program code is present for identifying a load on the control surface to form an identified load. Program code is also present for identifying a direction of movement of the control surface from the identified load to form an identified movement. Further, program code is present for engaging a brake associated with the control surface if the identified movement is away from a desired position for the control surface.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
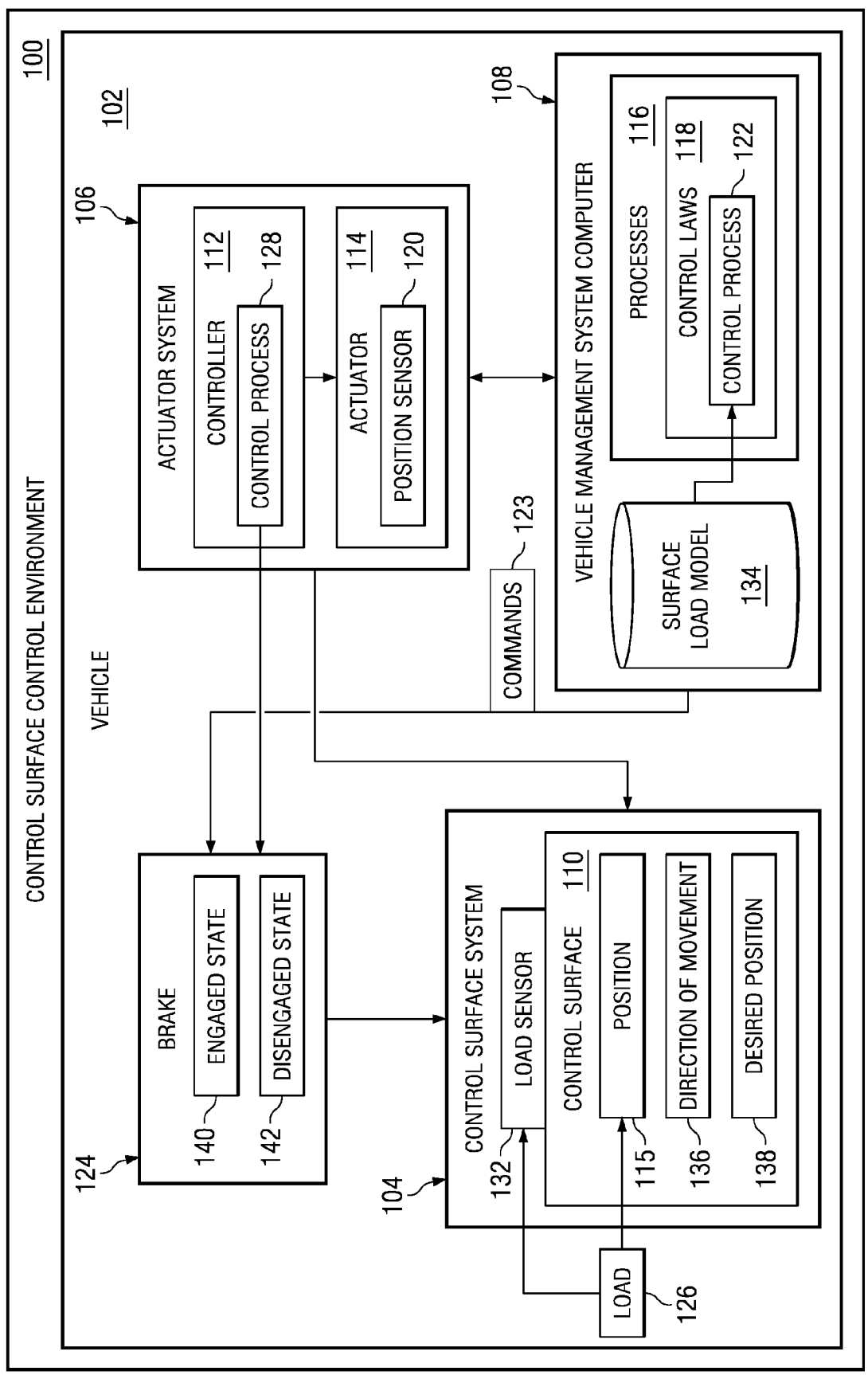
FIG. 1 is a diagram of a control surface control environment in accordance with an advantageous embodiment.

With reference now to the figures and, in particular, with reference now to FIG. 1, a diagram of a control surface control environment is depicted in accordance with an advantageous embodiment. Control surface control environment 100 may be implemented using vehicle 102. In these examples, vehicle 102 may take various forms. For example, without limitation, vehicle 102 may be an aircraft, a surface ship, a train, a spacecraft, a submarine, an aircraft carrier, a pleasure boat, a bus, an automobile, or some other suitable vehicle.

Control surface system 104 is present within vehicle 102 and may be controlled to change the flow of air and/or liquid over different surfaces of vehicle 102. Control surface system 104 may be controlled by actuator system 106. Actuator system 106 may change the position of control surface system 104 in response to commands received from vehicle management system computer 108.

In these examples, control surface system 104 contains control surface 110. Actuator system 106 may include controller 112 and actuator 114. Controller 112 may receive commands from vehicle management system computer 108. In response to these commands, controller 112 may send signals to actuator 114 to move actuator 114.

Position 115 of control surface 110 may be changed by actuator 114 under the control of controller 112. In these examples, control surface 110 may take various forms. For example, when vehicle 102 takes the form of a fixed wing aircraft, control surface 110 may be, for example, without limitation, an aileron, an elevator, a rudder, an elevator trim, a rudder trim, a flap, a flaperon, and/or some other suitable control surface. Actuator 114 may be an electromechanical actuator, a hydraulic actuator, or some other suitable type of actuator capable of changing position 115 of control surface 110.

Processes 116 may execute on vehicle management system computer 108 to control various systems, including actuator system 106. Control laws 118 in processes 116 may be used to control actuator system 106 to provide appropriate commands to actuator 114 to change position 115 of control surface 110. Position sensor 120 in actuator 114 may provide information to control laws 118 to identify position 115 of control surface 110. Alternatively, position 115 may be measured directly from control surface 110 and/or by any means that provides an accurate identification of the true surface position of control surface 110.

In the event that a failure occurs within actuator system 106 or somewhere between actuator system 106 and vehicle management system computer 108, control process 122 in control laws 118 may be used to control position 115 of control surface 110. For example, a failure may occur in actuator 114. In some instances, commands sent by control laws 118 to actuator 114 may fail to reach actuator 114.

The different advantageous embodiments recognize and take into account that redundant actuator control processes and actuators may be present to control control surface 110. However, the different advantageous embodiments recognize and take into account that these additional components may add to the weight and expense of an aircraft.

Control process 122, in these examples, may provide a coarser control for control surface 110. Control process 122 may send commands 123 to control brake 124. Brake 124 may be controlled in a manner that allows control surface 110 to be selectively moved based on load 126 applied to control surface 110.

In some advantageous embodiments, instead of using control process 122 in control laws 118, control process 128 in controller 112 may be used to control brake 124.

In response to detecting a failure of actuator 114 to change position 115 to desired position 138 for control surface 110, control process 122 may identify load 126 on control surface 110. Load 126 may be identified using load sensor 132, which is associated with control surface 110.

In other advantageous embodiments, load 126 may be identified using surface load model 134. Surface load model 134 may be a table, a database, and/or some other suitable data structure that is capable of identifying load 126 on control surface 110 based on inputs. These inputs may include, for example, without limitation, at least one of an angle of attack, a mach number, a surface position of the control surface, and/or some other suitable input. The output is an estimated load, which is load 126 in these examples.

Based on identifying load 126, control process 122 is capable of identifying direction of movement 136 for control surface 110. Direction of movement 136 may be the actual direction that control surface 110 moves and/or may be the possible direction that control surface 110 may move in response to load 126. In other words, direction of movement 136 may not be the actual movement of the control surface, but the movement that load 126 can cause for control surface 110.

Based on direction of movement 136 and desired position 138 for control surface 110, brake 124 may be changed between engaged state 140 and disengaged state 142. If control surface 110 has direction of movement 136 away from desired position 138, control process 122 sends commands 123 to change brake 124 to engaged state 140.

By engaging brake 124 and placing brake 124 in engaged state 140, movement of control surface 110 away from desired position 138 may be halted. When in engaged state 140, if control process 122 identifies load 126 as being capable of causing direction of movement 136 towards desired position 138, control process 122 sends commands 123 to release brake 124 placing brake 124 in disengaged state 142.

In disengaged state 142, brake 124 remains in this state as long as direction of movement 136 is towards desired position 138 and/or in desired position 138. In some advantageous embodiments, brake 124 may be engaged once control surface 110 reaches desired position 138.

In these illustrative examples, brake 124 may be implemented in a number of different ways. For example, brake 124 may be implemented as part of actuator 114. With this type of implementation, brake 124 may be a spring biased disc brake that may be electromagnetically energized and de-energized.

Further, brake 124 may be implemented as a separate device that may be located in a location in which brake 124 is capable of holding control surface 110 in position 115 and/or desired position 138. Brake 124 may be a friction brake or any other suitable brake that is capable of stopping movement of control surface 110 in position 115 and/or desired position 138. Brake 124 may be attached to the same component as actuator 114 to control movement if actuator 114 is incapable of moving control surface 110.

In this manner, one or more of the different advantageous embodiments may be capable of positioning a control surface, such as control surface 110, if actuator 114 is unable to move control surface 110 to desired position 138. This capability may be provided to provide a backup that may require less complexity, expense, and/or weight as compared to current redundancy systems in place. Additionally, the different advantageous embodiments may prevent movement of control surface 110 away from and/or farther away from desired position 138. Further, as desired position 138 changes, the different advantageous embodiments may be capable of achieving desired position 138.

The illustration in FIG. 1 is not meant to imply physical or architectural limitations to the manner in which control surface control environment 100 may be implemented. Other components in addition to, or in place of, the ones illustrated may be used in some advantageous embodiments. Further, in yet other advantageous embodiments, some components may be unnecessary.

For example, in some advantageous embodiments, other control surfaces, in addition to control surface 110, may be controlled using brakes in addition to brake 124. In still other advantageous embodiments, load sensor 132 may be unnecessary. In still other advantageous embodiments, control process 128 in controller 112 may be used to generate commands 123 to control brake 124.

The illustration of control surface control environment 100 is not meant to imply physical or architectural limitations to the manner in which different advantageous embodiments may be implemented. Other components in addition to, or in place of, the ones illustrated may be implemented depending on the particular embodiment. Further, in some advantageous embodiments, some components may be unnecessary.

As another example, although control surface control environment 100 is implemented in vehicle 102, some advantageous embodiments may be implemented in objects other than a vehicle. For example, control surface control environment 100 may be implemented in an air conditioning system to control various control surfaces such as, for example, louvers, valves, and/or other suitable control surfaces to control airflow.

In yet other advantageous embodiments, control surface control environment 100 may be implemented in a hydraulic system and/or refining plant to control the flow of liquids. As yet another example, control process 122 may be implemented as an application specific integrated circuit or as a combination of hardware and software.

Figure 2:
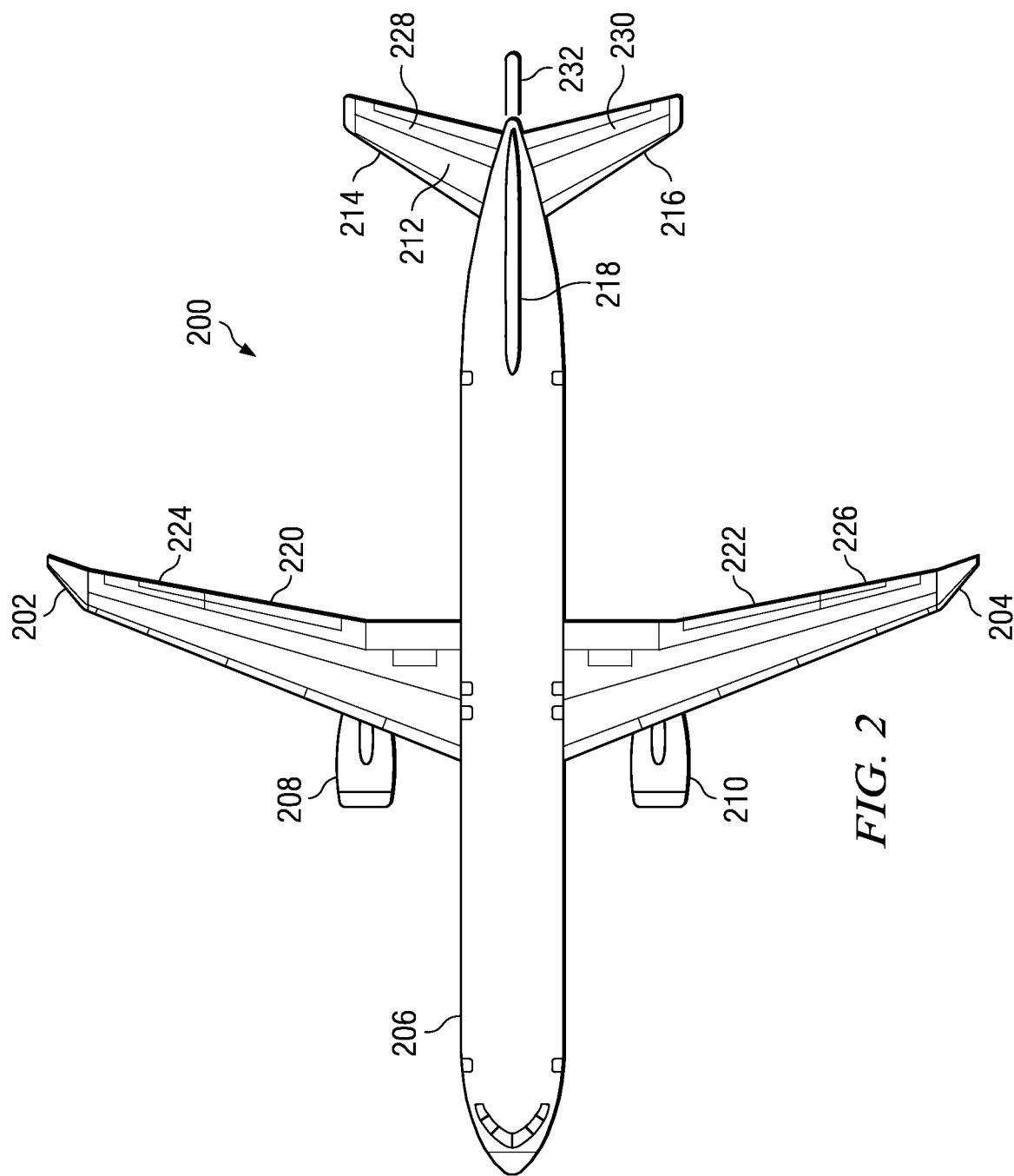
FIG. 2 is a diagram of an aircraft in accordance with an advantageous embodiment.

With reference now to FIG. 2, a diagram of an aircraft is depicted in accordance with an advantageous embodiment. Aircraft 200 is an example of one environment in which control surface control environment 100 may be implemented. Aircraft 200 is only one example of an implementation for vehicle 102 in FIG. 1. In this illustrative example, aircraft 200 has wings 202 and 204 attached to body 206. Aircraft 200 includes wing-mounted engine 208, wing-mounted engine 210, and tail 212. Tail 212 has horizontal stabilizer 214, horizontal stabilizer 216, and vertical stabilizer 218.

The advantageous embodiments may be implemented in one or more of the different control surfaces for aircraft 200. In particular, these control surfaces may be trailing edge control surfaces. For example, the different advantageous embodiments may be implemented to control flap 220 on wing 202 and/or to control flap 222 on wing 204. Further, aileron 224 on wing 202 and aileron 226 on wing 204 are examples of other trailing edge control surfaces that may be controlled using different advantageous embodiments. As yet additional examples, elevator 228 on horizontal stabilizer 214, elevator 230 on horizontal stabilizer 216, and rudder 232 on vertical stabilizer 218 are additional examples of trailing edge control surfaces that may be controlled using different advantageous embodiments.

Figure 3:
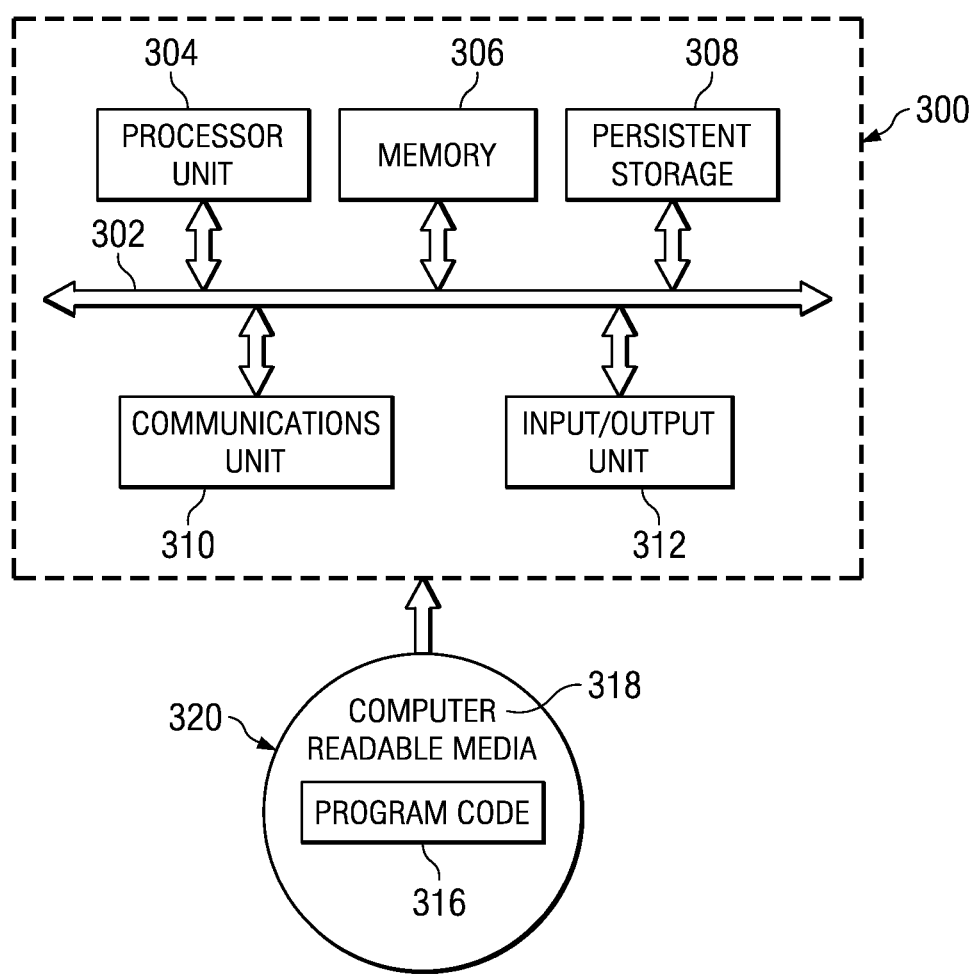
FIG. 3 is a diagram of a data processing system in accordance with an illustrative embodiment.

Turning now to FIG. 3, a diagram of a data processing system is depicted in accordance with an illustrative embodiment. In this illustrative example, data processing system 300 may be used to implement a computer, a controller, and/or some other suitable device. Data processing system 300 includes communications fabric 302, which provides communications between processor unit 304, memory 306, persistent storage 308, communications unit 310, and input/output (I/O) unit 312. Data processing system 300 may be used to implement devices in control surface control environment 100 in FIG. 1 and in aircraft 200 in FIG. 2. For example, data processing system 300 may be used to implement vehicle management system computer 108 and/or controller 112 in FIG. 1.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device. Persistent storage 308 may take various forms, depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Input/output unit 312 also may include one or more of these devices. Further, input/output unit 312 may send output to a printer. When data processing system 300 takes the form of a controller, input/output unit 312 may receive information from and/or send commands to a device, such as a sensor, an actuator, and/or some other suitable device.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. In these examples, program code 316 may be program code for control process 122 and/or control process 128 in FIG. 1. Program code 316 and computer readable media 318 form computer program product 320 in these examples.

In one example, computer readable media 318 may be in a tangible form such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to, or in place of, those illustrated for data processing system 300. Other components shown in FIG. 3 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache, such as found in an interface and memory controller hub that may be present in communications fabric 302.

Figure 4:
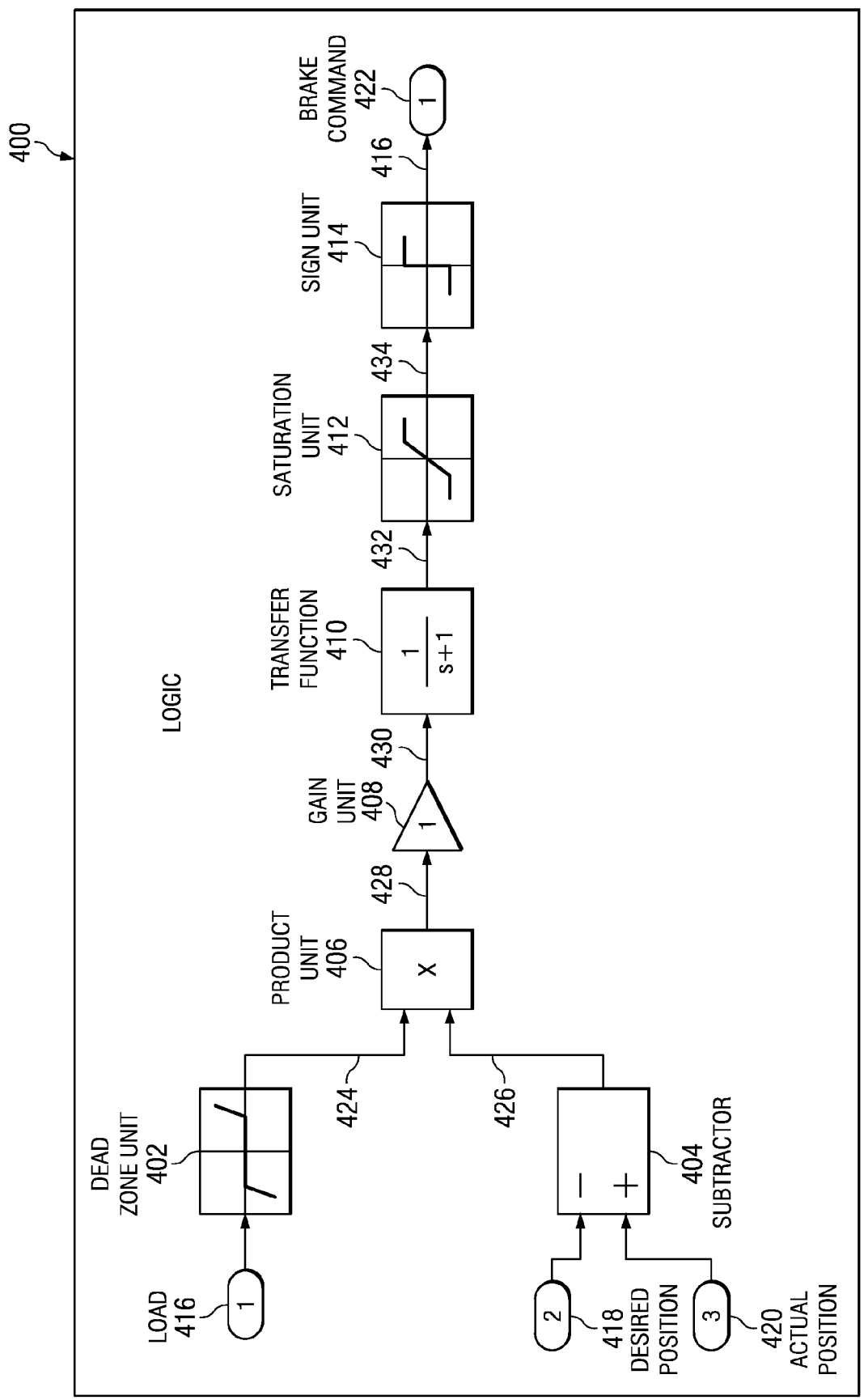
FIG. 4 is a logic diagram for a control process in accordance with an advantageous embodiment.

With reference now to FIG. 4, a logic diagram for a control process is depicted in accordance with an advantageous embodiment. In this example, logic 400 is an example of logic that may be implemented in a software and/or hardware component. Logic 400 may be implemented as program code 316 in FIG. 3 in these illustrative examples. For example, logic 400 may be implemented in control process 122 executing as part of control laws 118 in FIG. 1.

As illustrated, logic 400 comprises dead zone unit 402, subtractor 404, product unit 406, gain unit 408, transfer function 410, saturation unit 412, and sign unit 414. Input into logic 400 includes load 416, desired position 418, and actual position 420. The output of logic 400 is brake command 422. Brake command 422 is an example of a command within commands 123 in FIG. 1. Brake command 422 may be a command to either engage or disengage a brake, such as brake 124 in FIG. 1.

The brake command can come from a single data processing system, multiple data processing systems, or vehicle management system computer 108 in FIG. 1 as redundancy requirements of the controlled vehicle dictate. The choice to engage or disengage the brake by default in loss of power to multiple computers may be determined by the air vehicle designers based on the severity of failure modes that may occur in the brake system.

Load 416 may be an estimated load generated from a load sensor and/or a surface load model. Desired position 418 is the desired position for the control surface. Actual position 420 is the actual position of the control surface.

In this illustrative example, dead zone unit 402 produces a non-zero output when load 416 is greater than a minimum load needed to back drive an actuator associated with the control surface. In other words, dead zone unit 402 only generates a value when load 416 is greater than the force needed to overcome the friction to move the actuator. When the actuator is not powered, friction is present, which may prevent the actuator from moving unless a sufficient amount of load is present on the control surface. In other words, the control surface will not move unless load 416 is greater than the force needed to move the actuator.

Subtractor 404 subtracts desired position 418 from actual position 420. Dead zone unit 402 generates signal 424, which may be, for example, a monotonically increasing positive number or monotonically decreasing negative number. Alternatively, the output of dead zone unit 402 may be zero or a fixed positive or negative value. A non-zero value is present when load 416 is greater than the force needed to move the actuator. Subtractor 404 generates error 426. Optionally, dead zone unit 402 may be applied to error 426 if it is desired or acceptable to the vehicle control laws to allow a small amount of error to be considered equivalent to zero error. In this manner, the brake may be engaged from a disengaged state when the position is within an acceptable error of the desired surface position.

Error 426 is multiplied by signal 424 at product unit 406. Error 428 is generated by product unit 406. Error 428 is zero if signal 424 or error 426 is zero. Otherwise, the sign of error 428 provides the direction the surface is expected to move based on the applied load and the actual surface position versus the desired surface position. In these illustrative examples, the output of product unit 406 is a positive value if the load is expected to push or move the surface away from the desired position.

Different sign conventions may be used, in the different advantageous embodiments, so long as the logic is configured to produce a signal to engage the brake when the load is expected to push or move the surface away from the desired position and release the brake when the surface is to be moved towards the desired position.

Error 428 is multiplied by gain unit 408 to generate modified error 430. Gain unit 408 may be used to set the sensitivity of logic 400 to the inputs. Modified error 430 is sent into transfer function 410 to generate filtered error 432.

Transfer function 410 eliminates unwanted noise in the input signals in this example. Transfer function 410 may be implemented using any type of mathematical filter that eliminates real or mathematical noise from the various signals and does not introduce unacceptable time delay and/or reduced sensitivity to the control signals. Saturation unit 412 receives filtered error 432 and limits filtered error 432 to range from zero to one. The output of saturation unit 412 is limited signal 434.

Limited signal 434 is sent to sign unit 414, which generates a logic zero or a logic one for brake command 422. In these examples, a logic one for brake command 422 engages the brake, while a logic zero for brake command 422 disengages the brake. In other advantageous embodiments, it may be desirable to engage the brake with a logic zero or logic one and disengage the brake on negative value.

To implement this feature, saturation unit 412 may be changed to limit range from negative to positive one. In another embodiment, a zero output may be considered the same as logic one and a negative output considered logic zero if it is desired to use a logic one to engage the brake, and logic zero to disengage the brake.

In these examples, desired position 418 and actual position 420 have a positive value if the trailing edge of the control surface is down. If the trailing edge of the control surface is upward, these values may have a negative value.

Figure 5:
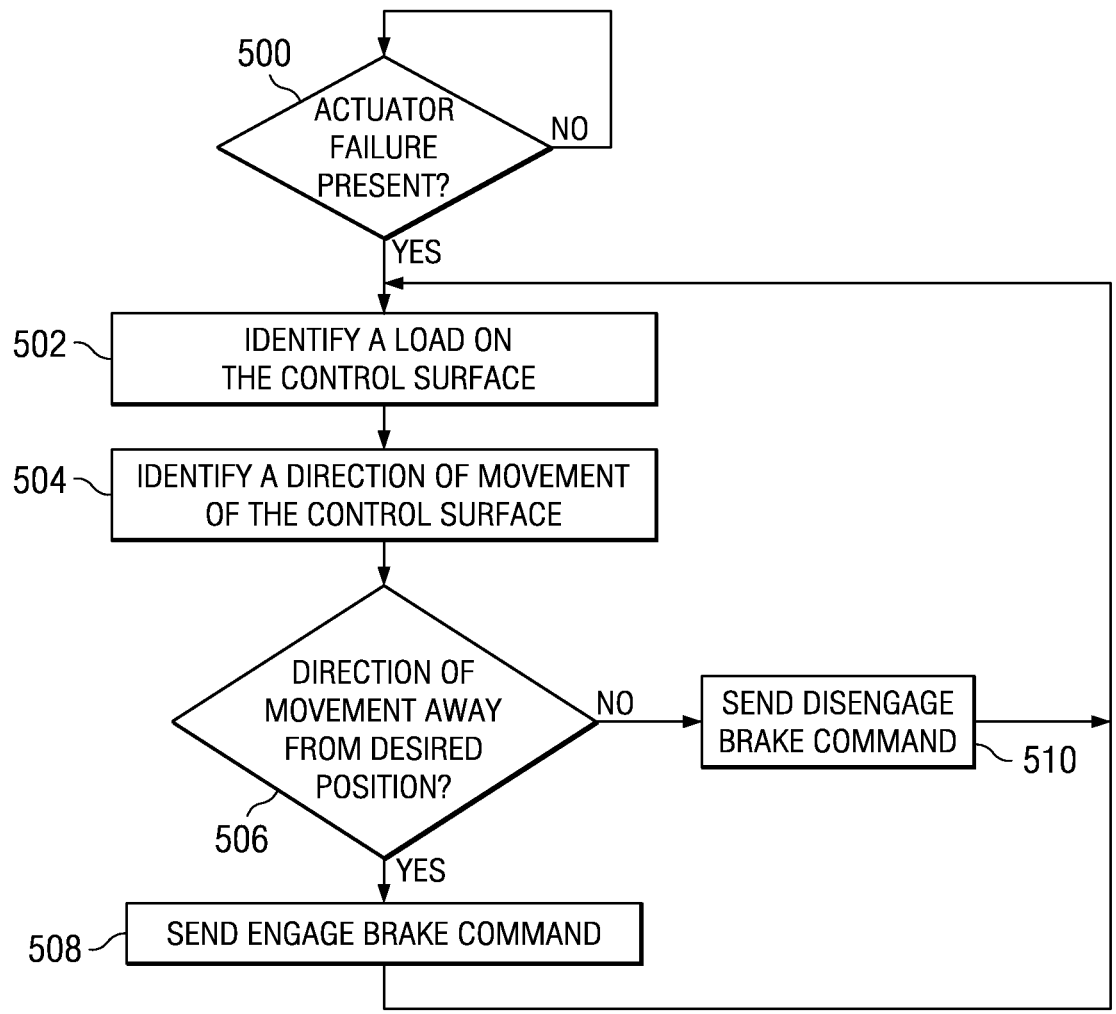
FIG. 5 is a flowchart of a process for controlling a control surface in accordance with an advantageous embodiment.

With reference now to FIG. 5, a flowchart of a process for controlling a control surface is depicted in accordance with an advantageous embodiment. The process illustrated in FIG. 5 may be implemented in a control surface control environment such as, for example, control surface control environment 100 in FIG. 1. The process illustrated in this example may be implemented as a software component and/or hardware component. As a software component, the process may be implemented in a component such as, for example, control process 122 in FIG. 1.

The process begins by determining whether an actuator failure is present (operation 500). If an actuator failure is not present, the process continues to return to operation 500. If an actuator failure is present preventing proper control of the actuator, the process identifies a load on the control surface (operation 502). The process identifies a direction of movement of the control surface from the load (operation 504).

The load identified in operation 502 may be a load as measured from a load sensor associated with the control surface. Alternatively, the load identified in operation 502 may be an estimated load using a surface load model for the control surface.

A determination is then made as to whether the direction of movement is away from a desired position (operation 506). If the direction of movement is away from the desired position, the brake is engaged (operation 508), with the process then returning to operation 502 as described above. If the direction of movement is not away from the desired position in operation 506, the brake is disengaged (operation 510), with the process then returning to operation 502.

Thus, the different advantageous embodiments provide a method for controlling a control surface. The different advantageous embodiments may be used in situations in which a primary control for an actuator fails to control the control surface as desired. The different advantageous embodiments selectively engage and disengage a brake associated with the control surface based on the direction of movement of the control surface. If the direction of movement of the control surface caused by the load is towards the desired position, the brake remains in a disengaged position. If the direction of movement of the control surface is away from the desired position, the brake is engaged.

Thus, at least some of the different advantageous embodiments may provide additional redundancy for actuator control systems. Further, when weight and cost is a factor, this type of system may be used in place of additional actuator redundancies. This type of redundancy system may be desirable for unmanned vehicles and/or as additional redundancies for actuator control systems.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer usable or computer readable medium providing program code for use by, or in connection with, a computer or any device or system that executes instructions. For the purposes of this disclosure, a computer usable or computer readable medium can generally be any tangible apparatus that can contain, store, communicate, propagate, or transport the program for use by, or in connection with, the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling a control surface of a vehicle, the control surface connected to an actuator and a brake, and wherein the actuator and brake are in communication with a vehicle management system computer, the method comprising:

identifying a load on the control surface, wherein an identified load is formed;

communicating the identified load to a unit in communication with the vehicle management system computer;

generating a signal from the unit, wherein the unit generates the signal only when the identified load exceeds a force needed to move the actuator;

identifying a direction of movement of the control surface from the identified load to form an identified movement;

engaging the brake associated with the control surface if the vehicle management system computer receives the signal and the identified movement is away from a desired position for the control surface; and disengaging the brake associated with the control surface if the vehicle management system computer receives the signal and the identified movement is towards a desired position for the control surface.

2. The method of claim 1, wherein the signal comprises one of a monotonically increasing positive number, a monotonically decreasing negative number, zero, a fixed positive value, or a fixed negative value.

3. The method of claim 1, wherein the step of identifying the load on the control surface comprises:

identifying the load on the control surface using a surface load model for the control surface.

4. The method of claim 3, wherein the surface load model includes as inputs an angle of attack, a mach number, and a surface position of the control surface.

5. The method of claim 1 further comprising:

engaging the brake if also an identified position is at or within an acceptable error of the desired position.

6. The method of claim 1, wherein the step of identifying the direction of movement of the control surface from the identified load to form the identified movement comprises:

identifying the direction of movement of the control surface from the identified load to form the identified movement in response to a failure of the actuator.

7. The method of claim 1, wherein the vehicle is selected from one of an aircraft, a surface ship, an aircraft carrier, a pleasure boat, a train, a spacecraft, a submarine, a bus, and an automobile.

8. The method of claim 1, wherein the step of identifying the load on the control surface comprises:

identifying the load on the control surface using a load sensor associated with the control surface.

9. An apparatus comprising:

an actuator system in communication with a brake and a control surface of a vehicle, wherein the actuator system comprises an actuator and a controller in communication with the actuator, wherein the control surface is connected to the actuator system and the brake, and wherein the controller is configured to execute a control process to identify a load on the control surface to form an identified load; identify a direction of movement of the control surface from the identified load to form an identified movement; and send an electronic command from the controller to the brake, wherein the command is configured to cause the brake to enter into an engaged state if the identified movement is away from a desired position for the control surface.

10. The apparatus of claim 9, wherein the actuator is selected from one of an electro-mechanical actuator and a hydraulic actuator.

11. The apparatus of claim 9, wherein the vehicle is selected from one of an aircraft, a surface ship, an aircraft carrier, a pleasure boat, a train, a spacecraft, a submarine, a bus, and an automobile.

12. The apparatus of claim 9, wherein the controller is further configured to execute the control process release the brake from an engaged state if the direction of movement subsequently moves towards the desired position for the control surface.

13. The apparatus of claim 9, wherein the controller is configured to execute the control process to identify the load on the control surface by using a surface load model for the control surface.

14. The apparatus of claim 13, wherein the surface load model is generated based on an angle of attack, a mach number, and a surface position of the control surface.

15. The apparatus of claim 9, wherein the controller is further configured to execute the control process in response to a failure of the actuator.

16. The apparatus of claim 9, wherein the controller is configured to execute the control process to identify the load on the control surface by using a load sensor associated with the control surface.

17. A non-transitory computer readable storage medium storing computer usable program code which, when executed by a processor, performs a method for controlling a control surface of a vehicle, the control surface connected to an actuator and a brake, and wherein the actuator and brake are in communication with a vehicle management system computer, the computer usable program code comprising:

computer usable program code for identifying a load on the control surface, wherein an identified load is formed;

computer usable program code for communicating the identified load to a unit in communication with the vehicle management system computer;

computer usable program code for generating a signal from the unit, wherein the unit generates the signal only when the identified load exceeds a force needed to move the actuator; and computer usable program code for engaging a brake associated with the control surface if the vehicle management system computer receives the signal.

18. The non-transitory computer readable storage medium of claim 17, wherein the computer usable program code further comprises:

computer usable program code for identifying a direction of movement of the control surface from the identified load to form an identified movement; and computer usable program code for releasing the brake from an engaged state if the direction of movement is towards a desired position for the control surface.

19. The non-transitory computer readable storage medium of claim 18, wherein the computer usable program code for identifying the load on the control surface comprises:

computer usable program code for identifying the load on the control surface using a load sensor associated with the control surface.

20. The non-transitory computer readable storage medium of claim 17, wherein the computer usable program code for identifying the load on the control surface comprises:

computer usable program code for identifying the load on the control surface using a surface load model for the control surface.

21. The non-transitory computer readable storage medium of claim 20, wherein the surface load model comprises an angle of attack, a mach number, and a surface position of the control surface.

* * * * *